United States Patent
Harish

(10) Patent No.: US 9,953,547 B2
(45) Date of Patent: Apr. 24, 2018

(54) WEARABLE DEVICE TO GUIDE A HUMAN BEING WITH AT LEAST A PARTIAL VISUAL IMPAIRMENT CONDITION AROUND AN OBSTACLE DURING LOCOMOTION THEREOF

(71) Applicant: Aditi B. Harish, Fremont, CA (US)

(72) Inventor: Aditi B. Harish, Fremont, CA (US)

(*) Notice: Subject to any disclaimer, the term of this patent is extended or adjusted under 35 U.S.C. 154(b) by 0 days.

(21) Appl. No.: 14/953,040

(22) Filed: Nov. 27, 2015

(65) Prior Publication Data

US 2016/0275816 A1    Sep. 22, 2016

Related U.S. Application Data

(60) Provisional application No. 62/134,603, filed on Mar. 18, 2015.

(51) Int. Cl.
G09B 21/00    (2006.01)

(52) U.S. Cl.
CPC ......... *G09B 21/001* (2013.01); *G09B 21/007* (2013.01); *G09B 21/008* (2013.01)

(58) Field of Classification Search
USPC ................. 701/532, 533, 516, 421, 411, 301
See application file for complete search history.

(56) References Cited

U.S. PATENT DOCUMENTS

| | | | | |
|---|---|---|---|---|
| 6,774,788 B1* | 8/2004 | Balfe | ...................... | A61H 3/061 340/4.12 |
| 8,812,231 B1* | 8/2014 | Brickous | ................ | A61H 3/068 701/488 |
| 9,492,343 B1* | 11/2016 | Ellis | ........................ | H04L 67/18 |
| 2006/0098089 A1* | 5/2006 | Sofer | ...................... | A61H 3/061 348/62 |
| 2007/0273624 A1* | 11/2007 | Geelen | .................... | G01C 21/36 345/84 |
| 2007/0282522 A1* | 12/2007 | Geelen | .................... | G01C 21/26 701/532 |
| 2008/0275647 A1* | 11/2008 | Shin | ...................... | G01S 15/025 701/301 |
| 2008/0309913 A1* | 12/2008 | Fallon | .................... | A61H 3/061 356/4.01 |
| 2011/0172907 A1* | 7/2011 | Rui Da Silva Freitas | ..................... | G09B 5/04 701/533 |

(Continued)

*Primary Examiner* — Richard A Goldman
(74) *Attorney, Agent, or Firm* — Raj Abhyanker, P.C.

(57) ABSTRACT

A wearable device includes a receiver circuit embedded within a dress accessory of a human being to receive a scattered component of a signal from a transmitter circuit, and a distance sensor circuit to sense distance between the human being and an obstacle responsible for the scattered component during locomotion of the human being. The human being is associated with at least partial visual impairment. The wearable device also includes a communication circuit embedded within the dress accessory or another dress accessory of the human being to communicate a varying distance between the human being and the obstacle through varying a time interval between communicative actions to be sensed by the human being. If the obstacle is determined to be a new static obstacle through a central server, data related to the obstacle is added to one or more database(s) associated with the central server.

17 Claims, 10 Drawing Sheets

(56) References Cited

U.S. PATENT DOCUMENTS

| | | | |
|---|---|---|---|
| 2012/0190386 A1* | 7/2012 | Anderson | G01C 15/04 455/456.3 |
| 2012/0223843 A1* | 9/2012 | Wall | G08G 1/095 340/944 |
| 2013/0013314 A1* | 1/2013 | Boschker | G10L 13/00 704/260 |
| 2013/0131985 A1* | 5/2013 | Weiland | G01C 21/20 701/516 |
| 2013/0218456 A1* | 8/2013 | Zelek | G01C 21/3652 701/412 |
| 2013/0220392 A1* | 8/2013 | Gassert | A61H 3/061 135/66 |
| 2014/0132388 A1* | 5/2014 | Alalawi | G09B 21/003 340/4.12 |
| 2014/0184384 A1* | 7/2014 | Zhu | G09B 21/003 340/4.12 |
| 2015/0070479 A1* | 3/2015 | Yu | G09B 21/003 348/62 |
| 2015/0104012 A1* | 4/2015 | Holman | H04N 1/4486 380/243 |
| 2016/0077202 A1* | 3/2016 | Hirvonen | G01S 13/90 342/25 R |
| 2016/0321955 A1* | 11/2016 | Zhu | G09B 21/007 |

* cited by examiner

WEARABLE DEVICE TO GUIDE A HUMAN BEING WITH AT LEAST A PARTIAL VISUAL IMPAIRMENT CONDITION AROUND AN OBSTACLE DURING LOCOMOTION THEREOF

CLAIM OF PRIORITY

This non-provisional patent application is a conversion application of and claims priority to the U.S. Provisional patent application No. 62/134,603 titled 'A WEARABLE GUIDANCE AND NAVIGATION TOOL FOR THE BLIND' filed on Mar. 18, 2015.

FIELD OF TECHNOLOGY

This disclosure relates generally to human beings with at least partial visual impairment conditions and, more particularly, to a device, a system and/or a method of a wearable device to guide a human being with at least a partial visual impairment condition around an obstacle during locomotion thereof.

BACKGROUND

A human being with an at least partial visual impairment condition may, for example, utilize a walking stick to "feel" obstacles and navigate therearound. The walking stick may get entangled with an obstacle, causing the human being to trip and fall. Further, the human being may encounter an unexpected obstacle into which he/she bumps into. Thus, obstacles may cause accidental injuries to the human being, which may even prove to be fatal.

For this reason, the human being may constantly require an assistant to guide him/her around the obstacles. The human being may, therefore, be completely dependent on the assistant.

The at least partial visual impairment condition may also be a temporary condition induced by, for example, a war situation. A soldier may not temporarily be able to see the environment surrounding him/her due to smoke. Therefore, the soldier may be vulnerable to attacks from an enemy and/or falls resulting from unwanted contacts with obstacles.

SUMMARY

Disclosed are a device, a system and/or a method of a wearable device to guide a human being with at least a partial visual impairment condition around an obstacle during locomotion thereof.

In one aspect, a method of guiding a human being with an at least partial visual impairment condition or a temporarily induced at least partial visual impairment condition during locomotion thereof is disclosed. The method includes embedding a receiver circuit within a dress accessory of the human being, and receiving a scattered component of a signal from a transmitter circuit through the embedded receiver circuit. The scattered component results from scattering of the signal from the transmitter circuit by an obstacle. The method also includes sensing data related to a distance between the human being and the obstacle during the locomotion of the human being through a distance sensor circuit communicatively coupled to the embedded receiver circuit in conjunction with a processor based on comparison between the scattered component and threshold values and/or the signal from the transmitter circuit, and embedding a communication circuit within the dress accessory or another dress accessory of the human being.

Further, the method includes communicating, through the communication circuit, a varying distance between the human being and the obstacle through varying a time interval between communicative actions configured to be sensed by the human being in order to enable the guidance during the locomotion thereof around the obstacle, and determining, through a central server in conjunction with the processor, location information of the blind human being. The central server is communicatively coupled to the processor through a computer network. Still further, the method includes determining, through the central server in conjunction with the processor, that the obstacle is a new obstacle about which data is unavailable in one or more database(s) associated with the central server based on the determined location information and predefined obstacle data stored in the one or more database(s) corresponding to the determined location information, determining, through the central server in conjunction with the processor, that the obstacle is a static obstacle based on a time-invariant characteristic of the received scattered component of the signal, and adding data related to the obstacle to the one or more database(s) associated with the central server following the determination thereof as the new obstacle and the static obstacle.

In another aspect, a system configured to guide a human being with an at least partial visual impairment condition or a temporarily induced at least partial visual impairment condition during locomotion thereof is disclosed. The system includes a transmitter circuit, a receiver circuit configured to be embedded within a dress accessory of the human being, a memory configured to store threshold values therein, and a processor communicatively coupled to the memory. The receiver circuit is configured to wirelessly receive a scattered component of a signal from the transmitter circuit. The scattered component results from scattering of the signal from the transmitter circuit by an obstacle.

The system also includes a distance sensor circuit communicatively coupled to the receiver circuit and the processor. The distance sensor circuit is configured to sense data related to a distance between the human being and the obstacle during the locomotion of the human being in conjunction with the processor based on comparison between the scattered component and the stored threshold values and/or the signal from the transmitter circuit.

Further, the system includes a communication circuit communicatively coupled to the processor and configured to be embedded within the dress accessory or another dress accessory of the human being. The communication circuit is configured to communicate a varying distance between the human being and the obstacle in conjunction with the processor through varying a time interval between communicative actions configured to be sensed by the human being in order to enable the guidance during the locomotion thereof around the obstacle.

Still further, the system includes a central server communicatively coupled to the processor through a computer network. The central server in conjunction with the processor is configured to: determine location information of the blind human being, determine that the obstacle is a new obstacle about which data is unavailable in one or more database(s) associated with the central server based on the determined location information and predefined obstacle data stored in the one or more database(s) corresponding to the determined location information, determine that the obstacle is a static obstacle based on a time-invariant characteristic of the received scattered component of the signal, and add data related to the obstacle to the one or more database(s) associated with the central server following the determination thereof as the new obstacle and the static obstacle.

In yet another aspect, a non-transitory medium, readable through a processor and/or a central server communicatively coupled to the processor and including instructions embodied therein that are executable therethrough, is disclosed. The instructions are related to guiding a human being with an at least partial visual impairment condition or a temporarily induced at least partial visual impairment condition during locomotion thereof. The non-transitory medium include instructions to receive a scattered component of a signal from a transmitter circuit through a receiver circuit embedded within a dress accessory of the human being, and instructions to sense data related to a distance between the human being and the obstacle during the locomotion of the human being through a distance sensor circuit communicatively coupled to the embedded receiver circuit in conjunction with the processor based on comparison between the scattered component and threshold values and/or the signal from the transmitter circuit. The scattered component results from scattering of the signal from the transmitter circuit by an obstacle.

The non-transitory medium also includes instructions to communicate, through a communication circuit embedded within the dress accessory or another dress accessory of the human being, a varying distance between the human being and the obstacle through varying a time interval between communicative actions configured to be sensed by the human being in order to enable the guidance during the locomotion thereof around the obstacle, and instructions to determine, through the central server in conjunction with the processor, location information of the blind human being. The central server is communicatively coupled to the processor through a computer network. Further, the non-transitory medium includes instructions to determine, through the central server in conjunction with the processor, that the obstacle is a new obstacle about which data is unavailable in one or more database(s) associated with the central server based on the determined location information and predefined obstacle data stored in the one or more database(s) corresponding to the determined location information, and instructions to determine, through the central server in conjunction with the processor, that the obstacle is a static obstacle based on a time-invariant characteristic of the received scattered component of the signal.

Still further, the non-transitory medium includes instructions to add data related to the obstacle to the one or more database(s) associated with the central server following the determination thereof as the new obstacle and the static obstacle.

The devices, systems and methods disclosed herein may be implemented in any means for achieving various aspects, and may be executed in a form of a machine-readable medium embodying a set of instructions that, when executed by a machine, causes the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a device, a system and/or a method of a wearable device to guide a human being with at least a partial visual impairment condition around an obstacle during locomotion thereof. Although the present embodiments have been described with reference to specific example embodiments, it will be evident that various modifications and changes may be made to these embodiments without departing from the broader spirit and scope of the various embodiments.

Figure 1:
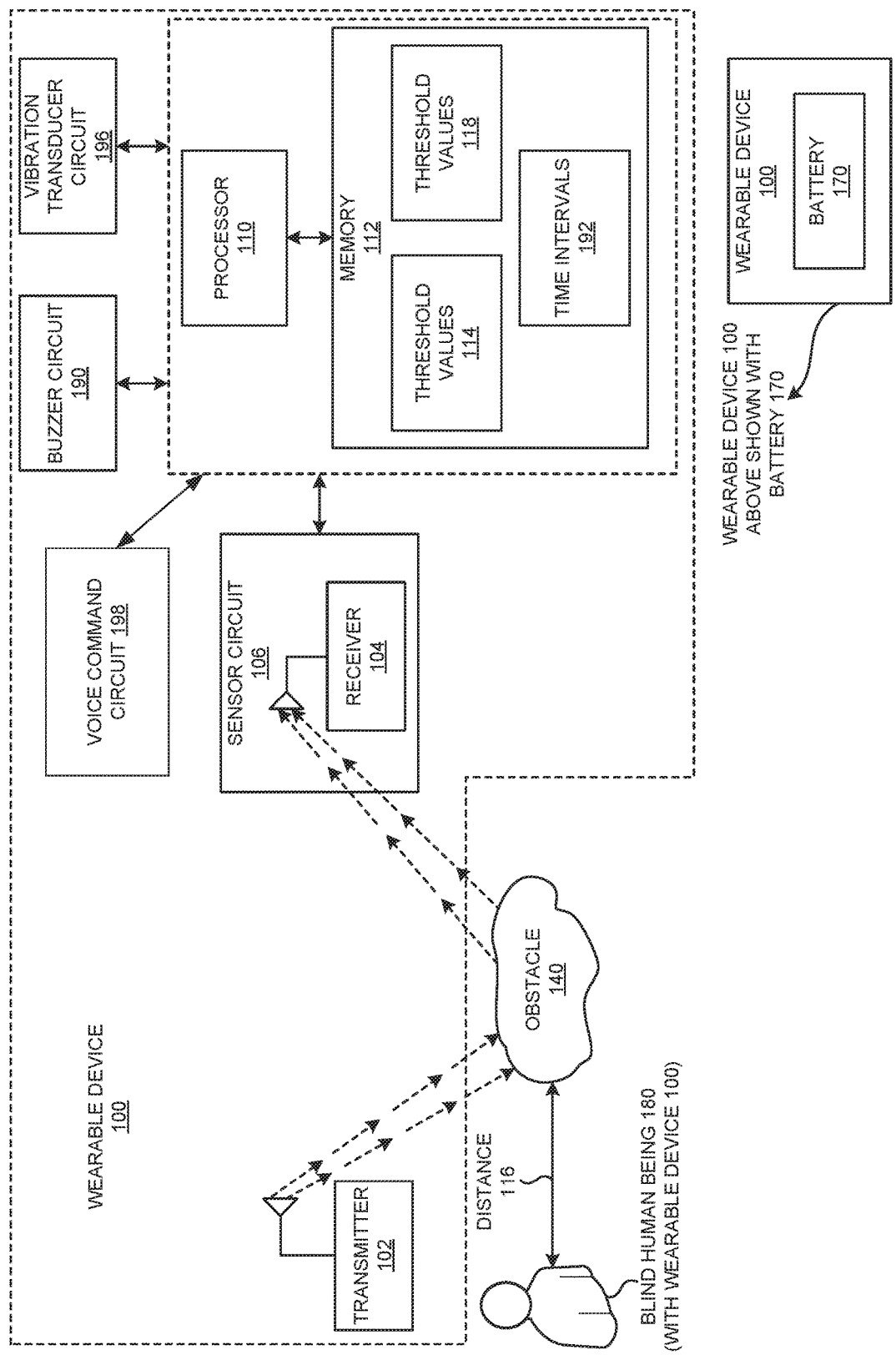
FIG. 1 is a schematic view of a wearable device configured to be worn on a dress accessory of a blind human being, according to one or more embodiments.

FIG. 1 shows a wearable device 100, according to one or more embodiments. In one or more embodiments, wearable device 100 may be configured to be worn on a dress accessory of a blind human being. Examples of the dress accessory may include but are not limited to: a cap/a hat, a belt, a shoe, a garment and a pair of glasses (e.g., spectacles, sunglasses). In one or more embodiments, wearable device 100 may include a transmitter 102 configured to wirelessly transmit radiation (or, a signal) to a receiver 104; transmitter 102 and receiver 104 may include circuitry therein to transmit/receive/process data in an appropriate format. In one or more embodiments, the radiation transmitted by transmitter 102 may be scattered by obstacles (e.g., obstacle 140) encountered by the blind human being during locomotion thereof. In one or more embodiments, at least a portion of the scattered radiation may be received at receiver 104, following which a characteristic of the scattered radiation may be analyzed and compared with stored characteristics and/or the radiation transmitted to determine a distance between obstacle 140 and the blind human being/receiver 104.

In one or more embodiments, wearable device 100 may include a processor 110 communicatively coupled to a memory 112 (e.g., a volatile memory and/or a non-volatile memory); the abovementioned analysis of the characteristic of the scattered radiation and the comparison thereof may be performed through processor 110. For the aforementioned purpose, in one or more embodiments, threshold values 114 corresponding to the scattered radiation may be stored in memory 112. In one embodiment, processor 110 may dynamically determine the distance (e.g., distance 116) between obstacle 140 and the blind human being during the course of movement of the blind human being in accordance with the comparison based on threshold values 114.

In one or more embodiments, receiver 104 (and, optionally, transmitter 102) may be part of a sensor circuit 106 configured to sense distance 116. Sensor circuit 106, as discussed above, may be a proximity/distance sensor configured to sense distance 116 based on a characteristic (e.g., amplitude) of the scattered radiation from obstacle 140. "Radiation," as discussed herein, may refer to electromagnetic/light radiation, infrared/heat radiation or a combination thereof. Other technologies that sensor circuit 106 may be associated with include but are not limited to ultrasound, radar and LIDAR. In other words, "radiation" may also refer to sound waves and laser light. In one or more embodiments, sensor circuit 106 may be communicatively coupled with processor 110, as shown in FIG. 1, which, in turn, may perform analyses associated with determining distance 116.

In one or more embodiments, processor 110 may be configured to control functionalities associated with wearable device 100. In one or more embodiments, wearable device 100 may be powered through a battery 170 as shown in FIG. 1. In one or more other embodiments, depending on the placement of transmitter 102 and receiver 104 (see below), separate batteries may power transmitter 102 and receiver 104.

Figure 2:
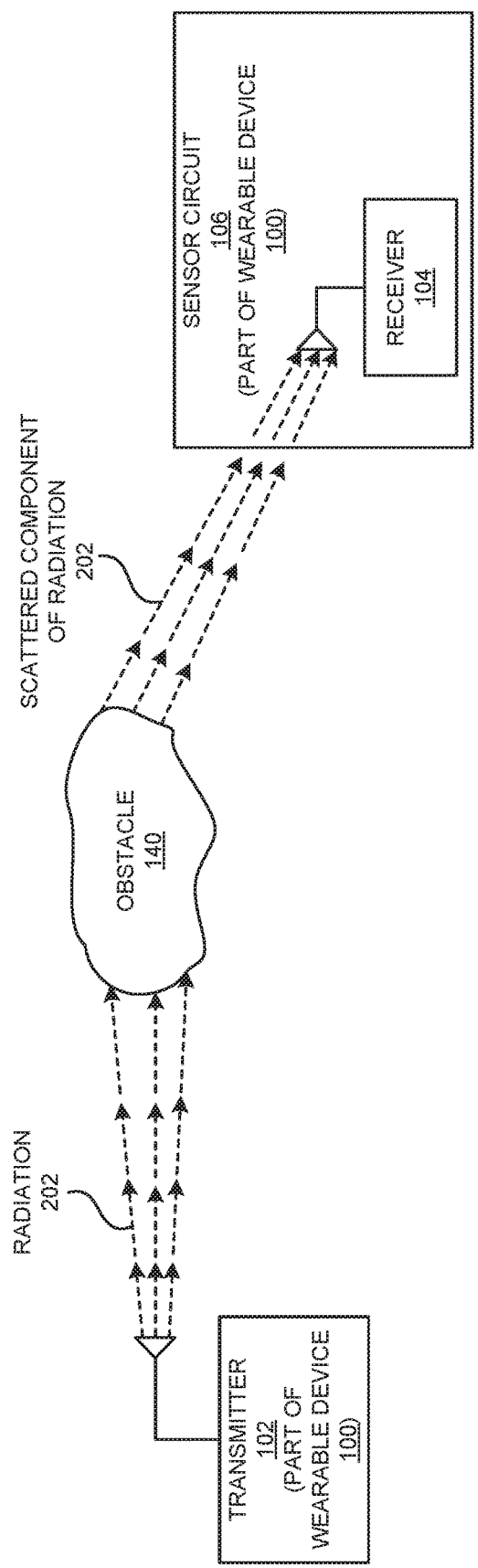
FIG. 2 is a schematic view of transmission and scattering/reflection of radiation from an obstacle and reception thereof at a sensor circuit of the wearable device of FIG. 1.

In one or more embodiments, the switching ON of wearable device 100 by the blind human being (e.g., blind human being 180) may enable battery 170 be the power source thereof; this may trigger transmission of radiation by transmitter 102. In the case of separate batteries being used for powering transmitter 102 and receiver 104, separate buttons/switches may be provided. In one or more embodiments, the scattered/reflected radiation from obstacle 140 may be received at receiver 104, which is part of sensor circuit 106. FIG. 2 shows the transmission and scattering/reflection of radiation (e.g., radiation 202) from obstacle 140 and reception thereof at sensor circuit 106, according to one or more embodiments. It should be noted that while FIGS. 1-2 show receiver 104 as part of sensor circuit 106, sensor circuit 106 may merely be coupled to receiver 104 in other exemplary embodiments. FIG. 2 shows transmitter 102 and receiver 104 as antenna based circuits configured to transmit/receive radiation.

Figure 3:
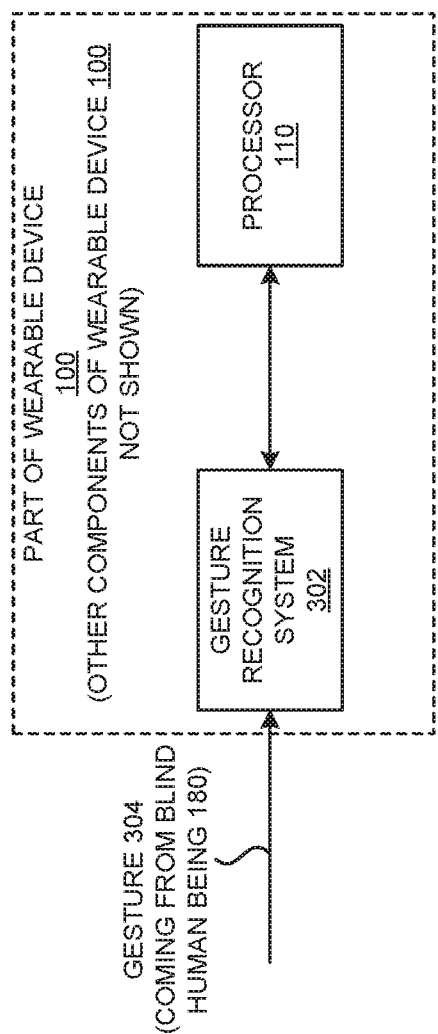
FIG. 3 is a schematic view of a gesture recognition system of the wearable device of FIG. 1.

FIG. 3 shows a gesture recognition system 302 communicatively coupled to processor 110, according to one or more embodiments. It should be noted that gesture recognition system 302 may encompass interpretation of a wide variety of gestures on part of blind human being 180. As discussed above, the switching ON of wearable device 100 may automatically cause transmission of radiation from transmitter 102. In one or more alternate embodiments such as the ones with reference to FIG. 3, transmitter 102 may not automatically transmit radiation 202 upon switching ON of wearable device 100. Here, a gesture 304 of blind human being 180 may be interpreted to initiate the transmission of radiation 202. Examples of gesture 304 may include but are not limited to pressing a raised physical button, a physical touch of wearable device 100/transmitter 102/receiver 104/sensor circuit 106, transmitting a voice command to wearable device 100 and shaking wearable device 100/transmitter 102/receiver 104/sensor circuit 106.

It is obvious that gesture recognition system 302 may include circuitry associated with interpreting the aforementioned examples of gesture 304; in other words, gesture recognition system 302 may include circuitry to interpret a pressing of the raised physical button, a touch sensor, a voice interpreter and/or a vibration sensor/gyroscope. Details of the aforementioned circuitry are well known to one skilled in the art; therefore, further description thereof has been omitted for the sake of brevity and clarity. It should be noted that interpretable gesture 304 may also be associated with switching ON of receiver 104 and/or sensor circuit 106.

In one or more embodiments, a characteristic of the scattered/reflected component of radiation 202 may obviously be dependent on distance 116 between blind human being 180 and obstacle 140; further, the characteristic of the scattered/reflected component of radiation 202 may be dependent on a nature (e.g., material (e.g., dielectric, metal) of obstacle 140, living obstacle, non-living obstacle) of obstacle 140. As an example characteristic of the scattered/reflected component of radiation 202, the power amplitude thereof increases with decrease in distance 116. As another example characteristic of the scattered/reflected component of radiation 202, the power amplitude thereof is more when obstacle 140 is metallic compared to the power amplitude when obstacle 140 is dielectric. Within dielectric materials, the power amplitude of the scattered/reflected component of radiation 202 varies with permittivity thereof.

It is obvious that sensor circuit 106, in conjunction with processor 110, may possess the capability to determine distance 116 based on the abovementioned capabilities. Referring back to FIG. 1, wearable device 100 may include buzzer circuit 190 communicatively coupled to processor 110. In one or more embodiments, upon determining distance 116, processor 110 may be configured to trigger buzzer circuit 190 to beep in a predefined pattern; for example, a time interval between beeps may be longer for a higher value of distance 116 and shorter for a lower value thereof. This way blind human being 180 may be configured to quickly determine the course of motion thereof based on hearing the beeps; blind human being 180 may thus avoid obstacles (e.g., including obstacle 140) on the course of motion thereof.

Other forms/communicative actions of indicating distance 116 to blind human being 180 are within the scope of the exemplary embodiments discussed herein. For example, wearable device 100 may include a vibration transducer circuit 196 communicatively coupled to processor 110, as shown in FIG. 1. Here, the time interval between vibrations may be controlled in accordance with the value of distance 116. Buzzer circuit 190/vibration transducer circuit 196 are example communication circuits configured to communicate a varying distance (e.g., distance 116) between blind human being 180 and obstacle 140 through varying a time interval between communicative actions (e.g., beeps, vibrations) configured to be sensed by blind human being 180 in order to enable the guidance during the locomotion thereof around obstacle 140.

As another example of a communicative action, voice commands may be triggered by an appropriate circuit (e.g., voice command circuit 198), and the time intervals between said voice commands may be varied in accordance with varying distance 116. Here, in an example implementation, blind human being 180 may be advised to turn left through a voice command. As obstacle 140 nears him/her, the time interval between voice commands may be reduced to induce urgency on part of blind human being 180.

Figure 4:
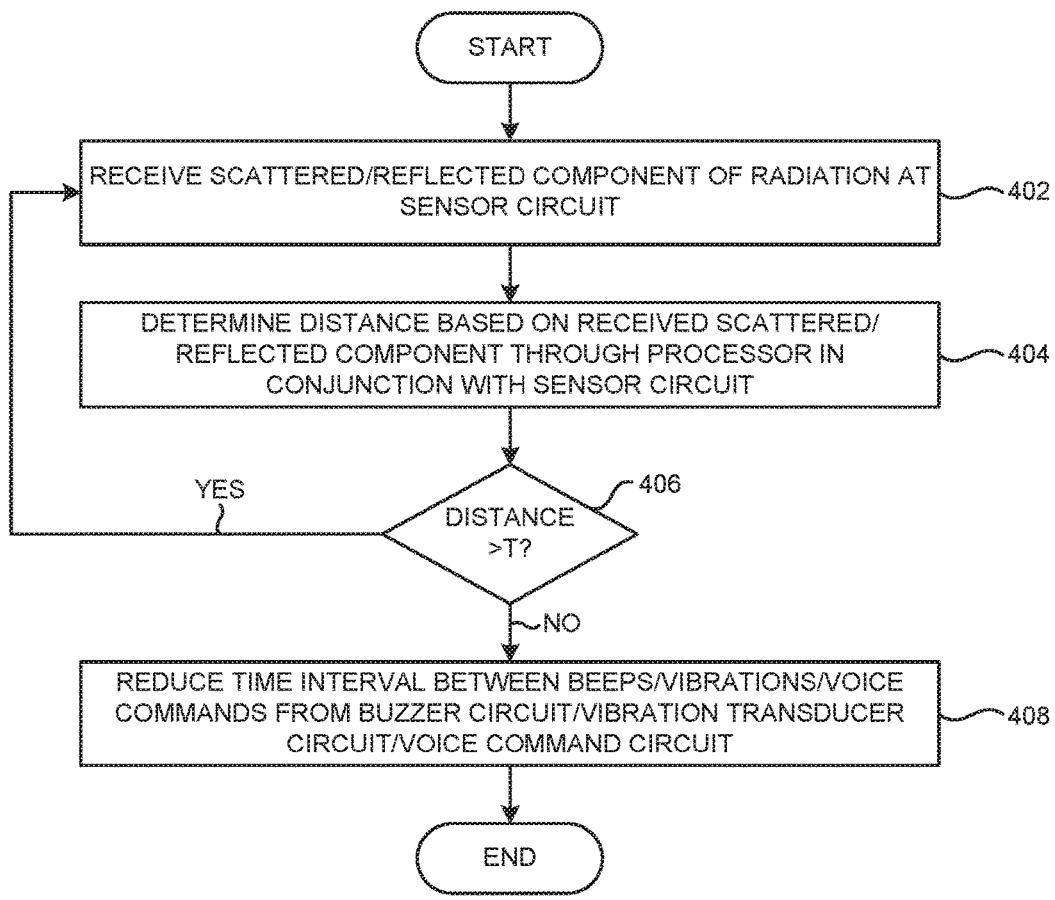
FIG. 4 is a flowchart detailing the operations involved in communicating distance between the blind human being and the obstacle to the blind human being through the wearable device of FIG. 1, according to one or more embodiments.

It should be noted that while FIG. 1 shows buzzer circuit 190, vibration transducer circuit 196 and voice command circuit 198 as part of wearable device 100, preferred embodiments may solely include buzzer circuit 190, vibration transducer circuit 196 or voice command circuit 198. In one or more embodiments, buzzer circuit 190, vibration transducer circuit 196 and voice command circuit 198 may also have a battery (not shown) associated therewith for powering thereof. In one or more alternate embodiments, buzzer circuit 190, vibration transducer circuit 196 and/or voice command circuit 198 may be part of sensor circuit 106 discussed above. FIG. 1 also shows time intervals 192 (e.g., of beeps, of vibrations, of voice commands) being stored in memory 112 for indicating distance 116 to blind human being 180. FIG. 4 shows a flowchart detailing the operations involved in communicating distance 116 to blind human being 180, according to one or more embodiments. In one or more embodiments, operation 402 may involve receiving scattered/reflected component of radiation 202 at sensor circuit 106. In one or more embodiments, operation 404 may involve determining distance 116 based on the received scattered/reflected component of radiation 202 through processor 110, in conjunction with sensor circuit 106.

In one or more embodiments, operation 406 may involve checking whether determined distance 116 is above a threshold T (e.g., part of threshold values 118 shown in memory 112 of FIG. 1). In one or more embodiments, if no, operation 408 may involve reducing a time interval 192 between beeps/vibrations/voice commands from buzzer circuit 190/ vibration transducer circuit 196/voice command circuit 198.

Figure 5:
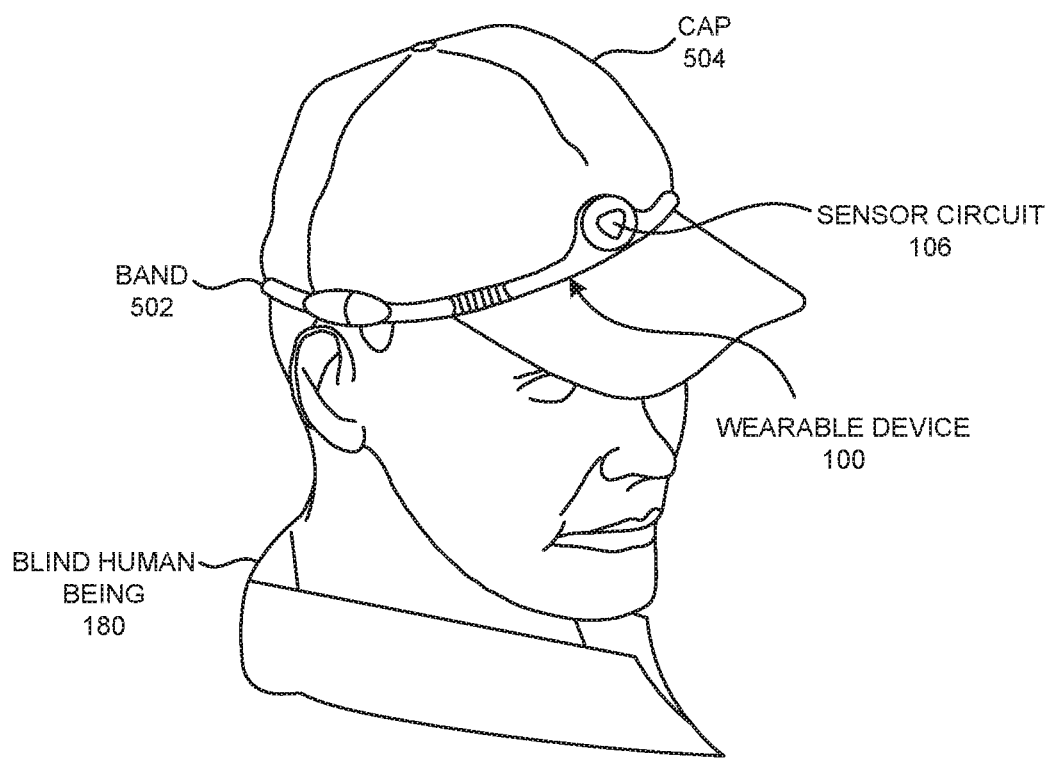
FIG. 5 is an illustrative view of an example wearable device as including a sensor circuit embedded within a band of a cap configured to be worn by a blind human being.
Figure 6:
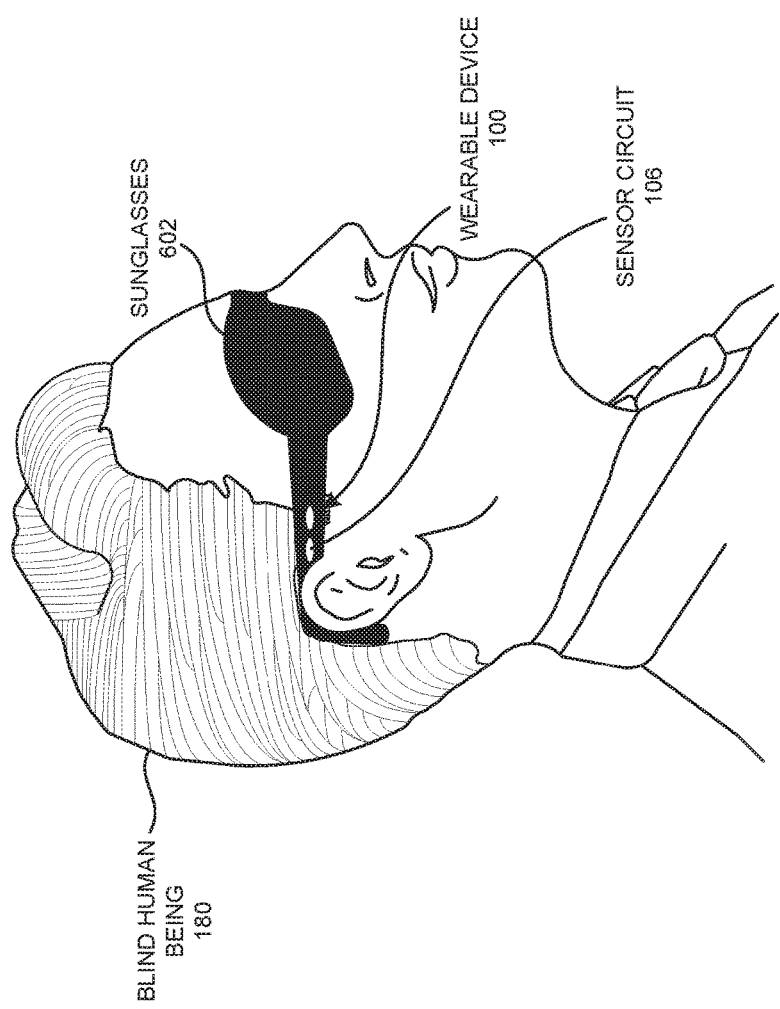
FIG. 6 is an illustrative view of an example wearable device as including a sensor circuit embedded within a pair of sunglasses configured to be worn by a blind human being.

FIG. 5 shows wearable device 100 as including sensor circuit 106 embedded within a band 502 configured to be worn over a cap 504 (or a hat) of blind human being 180. Here, transmitter 102 may also be embedded (not shown) within band 502; alternately, transmitter 102 may be embedded (not shown) within a separate dress accessory (e.g., a belt) of blind human being 180. FIG. 6 shows wearable device 100 as including sensor circuit 106 embedded within a pair of sunglasses 602 configured to be worn by blind human being 180. Again, here, transmitter 102 may either be also embedded within sunglasses 602 or embedded within the separate dress accessory (e.g., belt) of blind human being 180.

Figure 7:
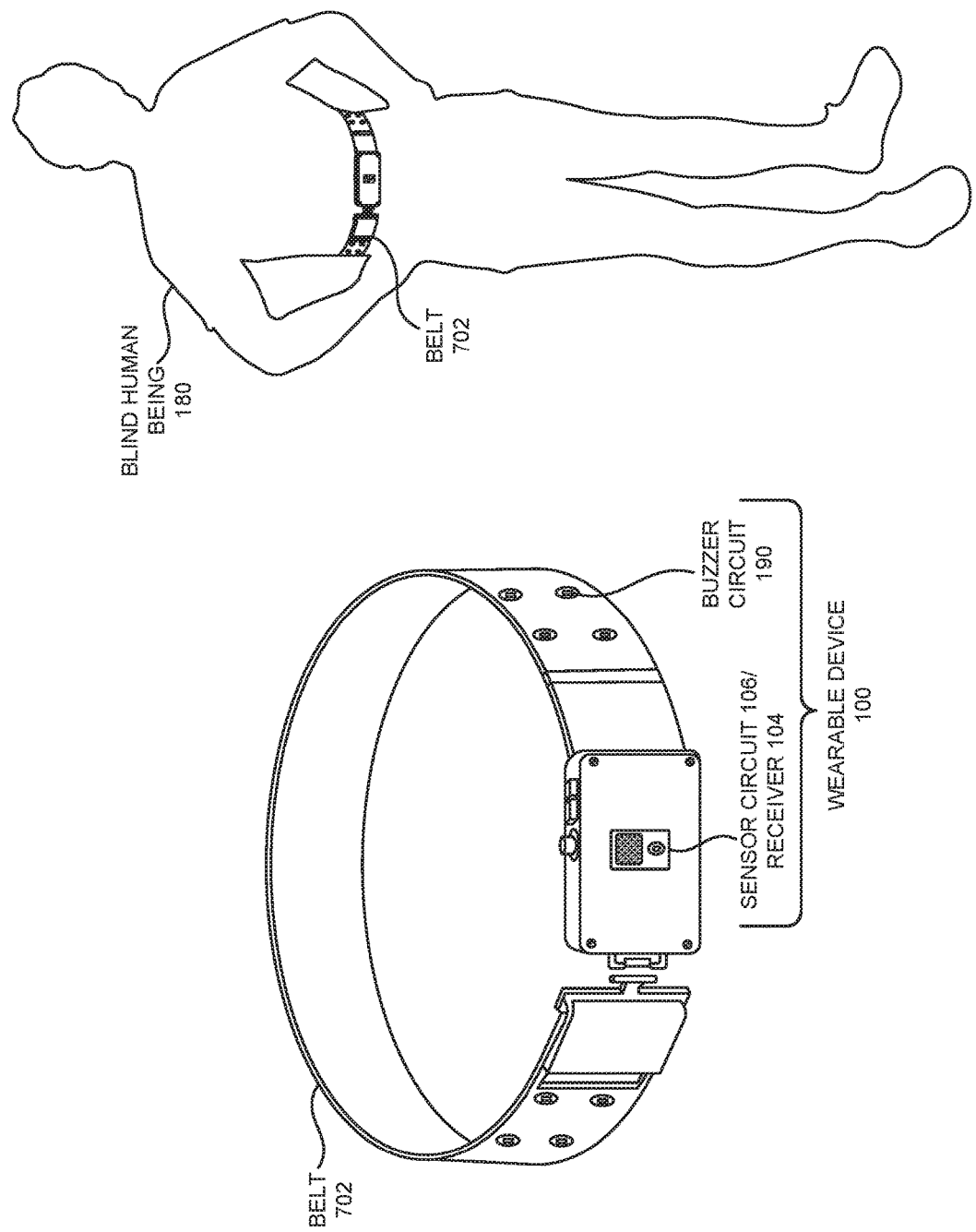
FIG. 7 is an illustrative view of an example wearable device as including a sensor circuit, a receiver and a buzzer circuit embedded within a belt configured to be worn by a blind human being.
Figure 8:
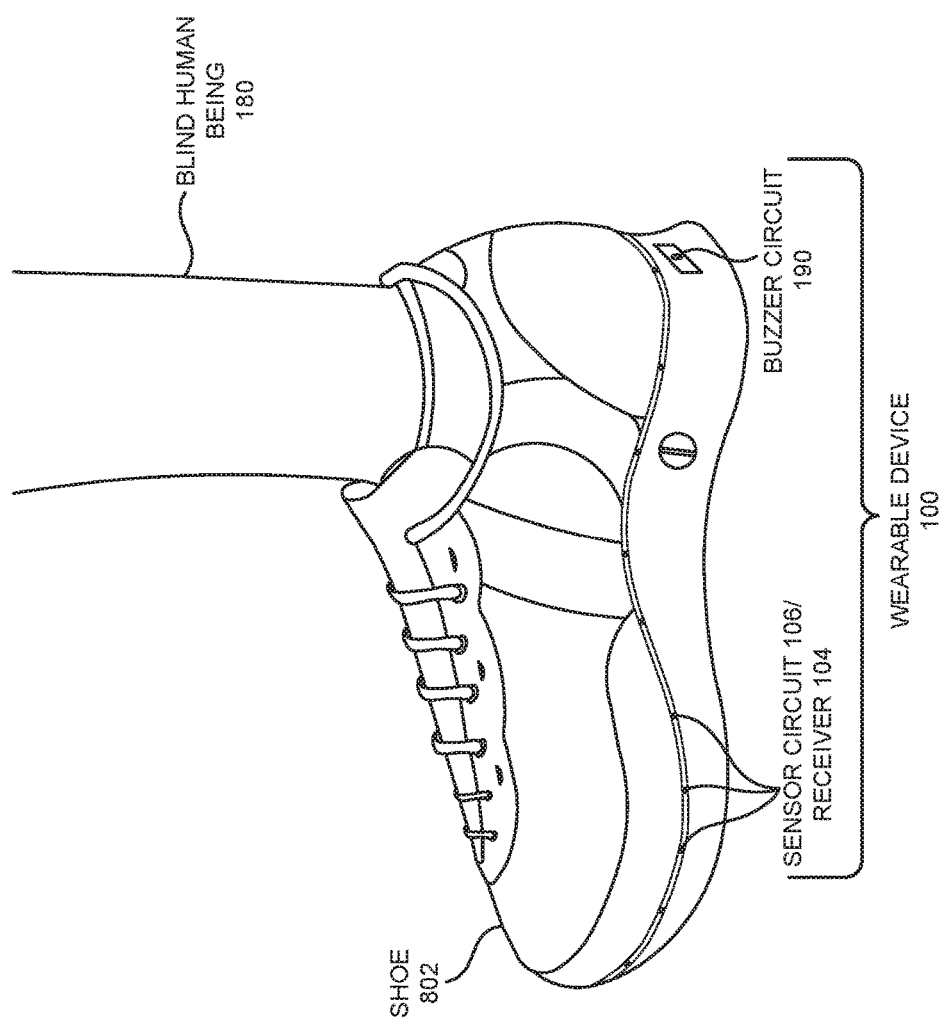
FIG. 8 is an illustrative view of an example wearable device as including a sensor circuit, a receiver and a buzzer circuit embedded within a shoe configured to be worn by a blind human being.

FIG. 7 shows wearable device 100 as including sensor circuit 106/receiver 104 embedded within a belt 702 configured to be worn by blind human being 180. Also, FIG. 7 shows buzzer circuit 190 also being embedded within belt 702. While FIG. 7 does not show transmitter 102, it is obvious yet again that transmitter 102 may either also be embedded within belt 702 or be embedded within another dress accessory of blind human being 180. FIG. 8 illustrates the same concept as FIG. 7, except that here the dress accessory within which sensor circuit 106/receiver 104 and buzzer circuit 190 are embedded is a shoe 802 configured to be worn by blind human being 180.

Figure 9:
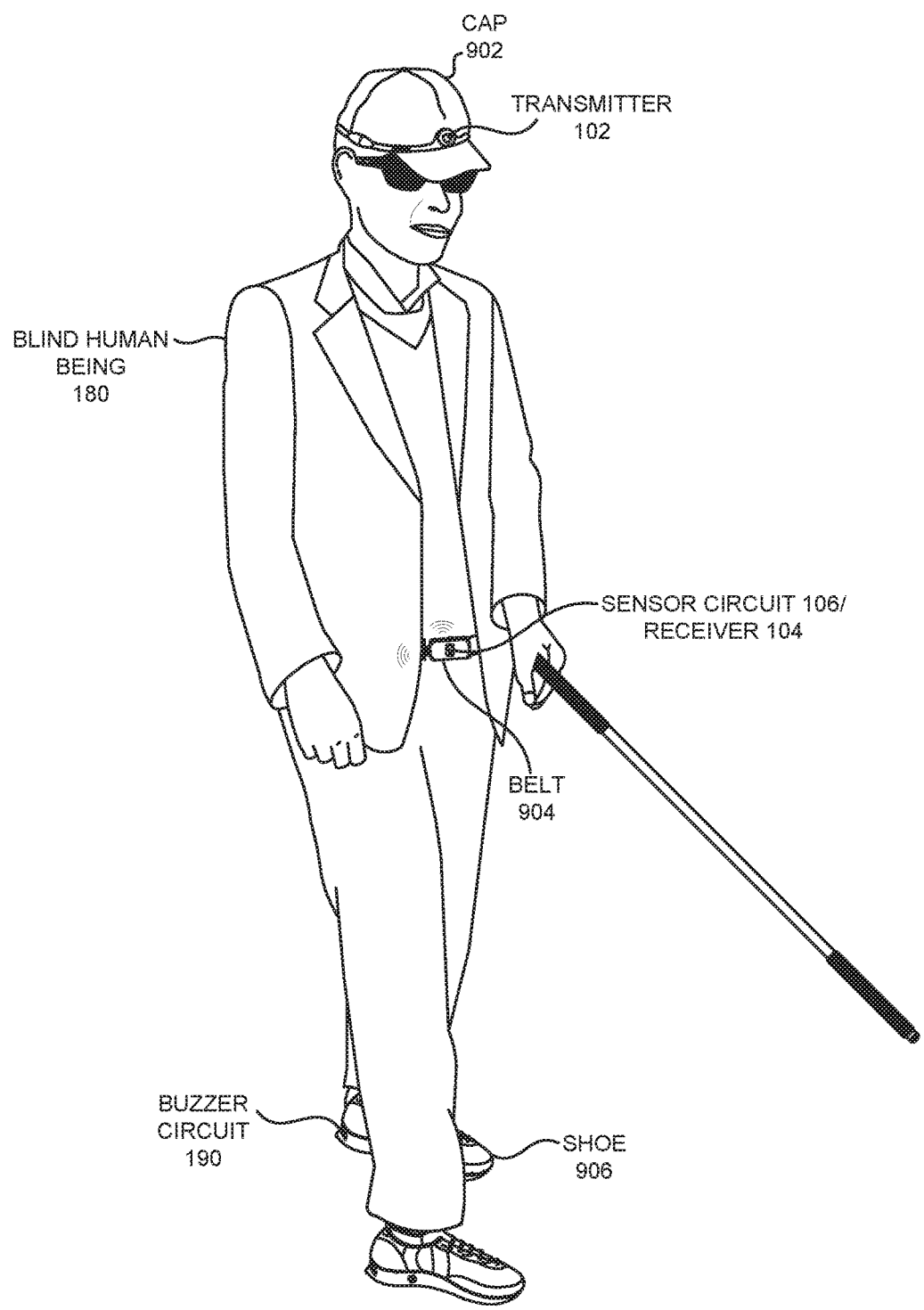
FIG. 9 is an illustrative view of an example wearable device as including a transmitter embedded within a cap, a sensor circuit/receiver embedded within a belt and a buzzer circuit embedded within a shoe configured to be worn by a blind human being.

FIG. 9 shows transmitter 102 being embedded within a cap 902, sensor circuit 106/receiver 104 being embedded within a belt 904 and buzzer circuit 190 being embedded within a shoe 906 configured to be worn by blind human being 180. The working of wearable device 100 with reference to FIGS. 5-9 may be understood easily from the above detailed discussion.

Variations in the exemplary embodiments discussed above may include but are not limited to a single board/chip solution of wearable device 100 and even a LEGO® MINDSTORMS® Education programmable EV3 brick. Features of the aforementioned brick are well known to one skilled in the relevant art. Therefore, detailed discussion associated therewith has been skipped for the sake of brevity and clarity. The brick, or, intelligent controller, may support Universal Serial Bus (USB), Bluetooth® and wired/wireless network communication with a computing device (e.g., a personal computer), and may include a programmable interface that enables programming and data logging therethrough, a processor (example processor 110) and a memory (example memory 112) communicatively coupled to the processor.

A LEGO® MINDSTORMS® EV3 infrared sensor may serve as example sensor circuit 106 from which signals are emitted to the processor (programmable EV3 brick). A user interface view of a logic program for the programmable EV3 brick may be shown on a display screen of a computing device (e.g., a personal computer, a laptop, a mobile device, a smart television). It should be noted that programs may be downloaded to the programmable EV3 brick.

While use of wearable device 100 is discussed above with reference to blind human being 180, utility thereof may not be limited to complete blindness. Exemplary embodiments may be employed in the service of at least partially visually impaired human beings. Wearable device 100 may be used to guide an at least partially blind human being. Also, in certain embodiments, the at least partial blindness/visual impairment may merely be a temporary condition of blind human being 180. For example, in a battlefield, a soldier may be rendered temporarily blind/visually impaired due to smoke; the soldier (example blind human being 180) may require guidance around obstacles 140. Thus, concepts associated with the exemplary embodiments discussed herein may be applicable to both permanent and temporary forms of at least partial visual impairment.

Further, it may not be required of wearable device 100 to include battery 170. Wearable device 100 or components thereof may be powered through another data processing device (e.g., a mobile phone; not shown). For the aforementioned purpose, wearable device 100 may include an appropriate interface (e.g., a USB interface) to enable coupling thereof to the another data processing device to be powered therethrough. Further, multiple transmitters (e.g., transmitter 102, transmitters embedded within dress accessories of blind human being 180, external transmitters) may be utilized to obtain an accurate estimation of distance 116, and to provide blind human being 180 with a 360 degree perspective of his/her surroundings.

Figure 10:
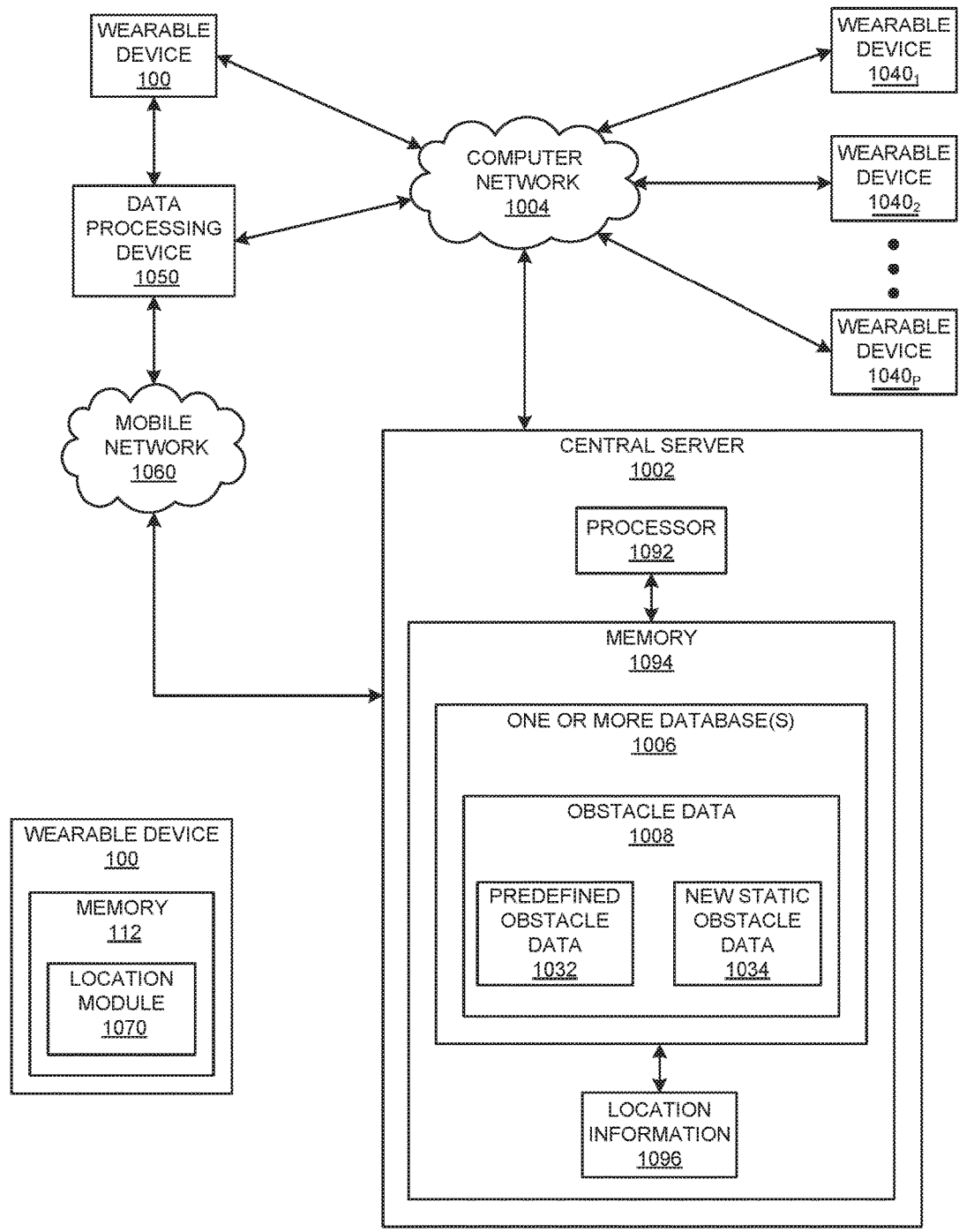
FIG. 10 is a schematic view of a central server communicatively coupled to the wearable device of FIG. 1, according to one or more embodiments.

FIG. 10 shows wearable device 100 being communicatively coupled to a central server 1002 through a computer network 1004 (e.g., a Wide Area Network (WAN), Internet, a Local Area Network (LAN)), according to one or more embodiments. In one or more embodiments, central server 1002 may include one or more database(s) 1006 associated therewith. FIG. 10 shows one or more database(s) 1006 as being part of central server 1002 for example purposes. It should be noted that, in one or more example embodiments, central server 1002 may include one or more servers (not shown) therein. In one or more embodiments, the one or more database(s) 1006 may include obstacle data 1008 stored therein. In one or more embodiments, the aforementioned storing may be the result of population of the one or more database(s) 1006 through previous instances of obstacle detection through wearable device 100 (and/or other wearable devices 1040$_{1-P}$ therethrough; FIG. 10 shows wearable devices 1040$_{1-P}$ also communicatively coupled to central server 1002 through computer network 1004). Alternately, the one or more database(s) 1006 may be populated with external data (e.g., data from other entities) as obstacle data 1008.

In one or more embodiments, as shown in FIG. 10, obstacle data 1008 may include data about obstacles (e.g., obstacle 140) to prospectively be encountered by at least partially visually impaired human beings (e.g., including blind human being 180). Obviously, obstacle data 1008 may also include data about other obstacles encountered by users of wearable devices 1040$_{1-P}$. Referring back to FIG. 1 and FIG. 3, upon successful interpretation of gesture 304 through gesture interpretation circuit 302, a communication may be transmitted to central server 1002 to initiate appropriate processing therethrough. In one or more embodiments, wearable device 100 may be associated with a location module configured to detect location information (e.g., geospatial coordinates) of blind human being 180. In one or more example embodiments, wearable device 100 may be part of a data processing device (e.g., a mobile device such as a mobile phone, a smart media player, a tablet); alternately, wearable device 100 may be communicatively coupled to a data processing device 1050, as shown in FIG. 10. The aforementioned data processing device 1050 may also be coupled to central server 1002 through computer network 1004 and/or another computer network such as a mobile network 1060, as shown in FIG. 10.

In one or more embodiments, the appropriate processing discussed above may involve determining, through central server 1002 in conjunction with wearable device 100, location information of blind human being 180. As shown in FIG. 10, wearable device 100 may include a location module 1070 therefor (e.g., stored in memory 112). FIG. 10 also shows central server 1002 as including a processor 1092 (e.g., multiple processors) communicatively coupled to a memory 1094 (or, multiple memories); memory 1094 may include location information 1096 of blind human being 180; memory 1094 may, in one embodiment, include the one or more database(s) 1006 discussed above.

In one or more embodiments, upon the determination of location information 1096 (e.g., Global Positioning System (GPS) coordinates) of blind human being 180, central server 1002 may determine one or more predefined obstacles to be encountered by blind human being 180 based on a correspondence between the determined location information 1096 and obstacle data 1008 (e.g., shown as including predefined obstacle data 1032). In one or more embodiments, the determination of distance 116 through processor 110 in conjunction with sensor circuit 106 discussed above may, in turn, trigger buzzer circuit 190/vibration transducer circuit 196/voice command circuit 198. However, in one or more embodiments, simultaneously, central server 1002 may determine if a determined distance (e.g., distance 116) relates to a predefined obstacle based on location information 1096 and predefined obstacle data 1032 corresponding to location information 1096. If no, in one or more embodiments, central server 1002, in conjunction with processor 110, may determine obstacle 140 to be a new obstacle and store data associated therewith in the one or more database(s) 1006/memory 1094 as a reference for new instances of detection of obstacles through wearable device 100/wearable devices 1040$_{1-P}$ and/or a user of central server 1002.

In one or more embodiments, a varying characteristic of the scattered/reflected component of radiation 202 may indicate a dynamic obstacle 140 (e.g., a moving dog, a moving vehicle). In such cases, in one or more embodiments, data associated with said dynamic obstacle 140 may not be added to the one or more database(s) 1006 of central server 1002. In one or more embodiments, only data associated with static obstacles (e.g., obstacle 140) may be added to the one or more database(s) 1006; obstacles may be determined to be static based on a time-invariant characteristic of the scattered/reflected component of radiation 202. FIG. 10 shows new static obstacle data 1034 (data associated with new static obstacles) also as being part of obstacle data 1008.

It is obvious that static obstacles may be removed at a subsequent point in time; in other words, detected static obstacles may not be permanent. Therefore, in one or more embodiments, subsequent instances of detection of obstacles based on location of blind human being 180/other users/other wearable devices 1040$_{1-P}$ may cause data about said static obstacles to be removed from the one or more database(s) 1006.

Thus, in one or more embodiments, the presence of central server 1002 may provide a user thereof with an up-to-date, complete map of obstacles corresponding to a location of blind human being 180. The completeness may serve to improve obstacle detection through wearable device 100/other wearable devices 1040$_{1-P}$. An example scenario of detection of obstacles within a supermarket/mall may be envisioned through the setup discussed above. Here, blind human being 180 may be guided smoothly around static/dynamic obstacles encountered during motion thereof. It should be noted that, in one embodiment, central server 1002 may trigger buzzer circuit 190/vibration transducer circuit 196/voice command circuit 198 upon detection of predefined obstacles. Here, the output of buzzer circuit 190/vibration transducer circuit 196/voice command circuit 198 may be different from an output thereof when triggered through processor 112 (in conjunction with sensor circuit 106). Sensor circuit 106, in conjunction with processor 110, may trigger buzzer circuit 190/vibration transducer circuit 196/voice command circuit 198 solely upon detection of new obstacles.

In one or more embodiments, instructions associated with operations performable through processor 110/central server 1002 and programming thereof may be tangibly embodied on a non-transitory medium (e.g., a Compact Disc (CD), a Digital Video Disc (DVD), a Blu-ray Disc®, a hard drive) readable and executable through a data processing device. The aforementioned instructions may also be downloaded from, say, the Internet into a memory (e.g., memory 112/memory 1094; another example non-transitory medium). All reasonable variations are within the scope of the exemplary embodiments discussed herein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:

1. A method of guiding a human being with one of: an at least partial visual impairment condition and a temporarily induced at least partial visual impairment condition during locomotion thereof, comprising:
   embedding a receiver circuit within a dress accessory of the human being;
   receiving a scattered component of a signal from a transmitter circuit through the embedded receiver circuit, the scattered component resulting from scattering of the signal from the transmitter circuit by an obstacle;
   sensing data related to a distance between the human being and the obstacle during the locomotion of the human being through a distance sensor circuit communicatively coupled to the embedded receiver circuit in conjunction with a processor based on comparison between the scattered component and at least one of: threshold values and the signal from the transmitter circuit;
   embedding a communication circuit within one of: the dress accessory and another dress accessory of the human being;
   communicating, through the communication circuit, a varying distance between the human being and the obstacle through varying a time interval between communicative actions of the communication circuit configured to be sensed by the human being in order to enable the guidance during the locomotion thereof around the obstacle;
   determining, through a central server in conjunction with the processor, location information of the human being, the central server being communicatively coupled to the processor through a computer network;
   determining, through the central server in conjunction with the processor, that the obstacle is a new obstacle about which data is unavailable in at least one database associated with the central server based on the determined location information and predefined obstacle data stored in the at least one database corresponding to the determined location information;
   determining, through the central server in conjunction with the processor, that the obstacle is a static obstacle based on a time-invariant characteristic of the received scattered component of the signal, the time-invariant characteristic of the received scattered component of the signal being a power amplitude thereof for the determined location information of the human being; and interpreting, through a gesture interpretation circuit, a gesture from the human being to at least one of: trigger transmission of the signal from the transmitter circuit, and switch on at least one of: the receiver circuit and the distance sensor circuit
   adding data related to the obstacle to the at least one database associated with the central server following the determination thereof as the new obstacle and the static obstacle.

2. The method of claim 1, further comprising:
   detecting, through the distance sensor circuit in conjunction with the processor, another obstacle during the locomotion of the human being;
   determining, through the central server in conjunction with the processor, that the another obstacle is also a new obstacle based on the determined location information and the predefined obstacle data; and
   determining, through the central server in conjunction with the processor, that the another obstacle is a dynamic obstacle based on a time variant characteristic of a received component of the signal from the transmitter circuit scattered by the another obstacle without adding data related to the another obstacle to the at least one database, the time variant characteristic of the received component of the signal scattered by the another obstacle being a power amplitude thereof for the determined location information of the human being.

3. The method of claim 1, wherein the transmitter circuit comprises a plurality of transmitters.

4. The method of claim 1, wherein at least one of:
   the communication circuit is one of: a buzzer circuit, a vibration transducer circuit, and a voice command circuit, and
   the communicative actions are a corresponding one of: beeps, vibrations and voice commands.

5. The method of claim 1, further comprising powering the receiver circuit through a battery.

6. The method of claim 1, wherein the dress accessory is at least one of: a cap, a hat, a belt, a shoe, a garment and a pair of glasses.

7. A system configured to guide a human being with one of: an at least partial visual impairment condition and a temporarily induced at least partial visual impairment condition during locomotion thereof, comprising:
   a transmitter circuit;
   a receiver circuit configured to be embedded within a dress accessory of the human being, the receiver circuit being configured to wirelessly receive a scattered component of a signal from the transmitter circuit, the scattered component resulting from scattering of the signal from the transmitter circuit by an obstacle;
   a memory configured to store threshold values therein;
   a processor communicatively coupled to the memory;
   a distance sensor circuit communicatively coupled to the receiver circuit and the processor, the distance sensor circuit being configured to sense data related to a distance between the human being and the obstacle during the locomotion of the human being in conjunction with the processor based on comparison between the scattered component and at least one of: the stored threshold values and the signal from the transmitter circuit;
   a communication circuit communicatively coupled to the processor and configured to be embedded within one of: the dress accessory and another dress accessory of the human being, the communication circuit being configured to communicate a varying distance between the human being and the obstacle in conjunction with the processor through varying a time interval between communicative actions of the communication circuit configured to be sensed by the human being in order to enable the guidance during the locomotion thereof around the obstacle; and
   a central server communicatively coupled to the processor through a computer network, the central server in conjunction with the processor being configured to:

determine location information of the human being,
determine that the obstacle is a new obstacle about which data is unavailable in at least one database associated with the central server based on the determined location information and predefined obstacle data stored in the at least one database corresponding to the determined location information,
determine that the obstacle is a static obstacle based on a time-invariant characteristic of the received scattered component of the signal, the time-invariant characteristic of the received scattered component of the signal being a power amplitude thereof for the determined location information of the human being, and comprising a gesture interpretation circuit configured to interpret a gesture from the human being to at least one of: trigger transmission of the signal from the transmitter circuit, and switch on at lest one of: the receiver circuit and the distance sensor circuit
add data related to the obstacle to the at least one database associated with the central server following the determination thereof as the new obstacle and the static obstacle.

8. The system of claim 7, wherein:
the distance sensor circuit is further configured to detect another obstacle during the locomotion of the human being, and
the central server in conjunction with the processor is further configured to:
determine that the another obstacle is also a new obstacle based on the determined location information and the predefined obstacle data, and
determine that the another obstacle is a dynamic obstacle based on a time variant characteristic of a received component of the signal from the transmitter circuit scattered by the another obstacle without adding data related to the another obstacle to the at least one database, the time variant characteristic of the received component of the signal scattered by the another obstacle being a power amplitude thereof for the determined location information of the human being.

9. The system of claim 7, wherein the transmitter circuit comprises a plurality of transmitters.

10. The system of claim 7, wherein the communication circuit is one of: a buzzer circuit, a vibration transducer circuit, and a voice command circuit, and the communicative actions are a corresponding one of: beeps, vibrations and voice commands.

11. The system of claim 7, wherein the dress accessory is at least one of: a cap, a hat, a belt, a shoe, a garment and a pair of glasses.

12. A non-transitory medium, readable through at least one of: a processor and a central server communicatively coupled to the processor and comprising instructions embodied therein that are executable therethrough, the instructions being related to guiding a human being with one of: an at least partial visual impairment condition and a temporarily induced at least partial visual impairment condition during locomotion thereof, and the non-transitory medium comprising:
instructions to receive a scattered component of a signal from a transmitter circuit through a receiver circuit embedded within a dress accessory of the human being, the scattered component resulting from scattering of the signal from the transmitter circuit by an obstacle;
instructions to sense data related to a distance between the human being and the obstacle during the locomotion of the human being through a distance sensor circuit communicatively coupled to the embedded receiver circuit in conjunction with the processor based on comparison between the scattered component and at least one of: threshold values and the signal from the transmitter circuit;
instructions to communicate, through a communication circuit embedded within one of: the dress accessory and another dress accessory of the human being, a varying distance between the human being and the obstacle through varying a time interval between communicative actions of the communication circuit configured to be sensed by the human being in order to enable the guidance during the locomotion thereof around the obstacle;
instructions to determine, through the central server in conjunction with the processor, location information of the human being, the central server being communicatively coupled to the processor through a computer network;
instructions to determine, through the central server in conjunction with the processor, that the obstacle is a new obstacle about which data is unavailable in at least one database associated with the central server based on the determined location information and predefined obstacle data stored in the at least one database corresponding to the determined location information;
instructions to determine, through the central server in conjunction with the processor, that the obstacle is a static obstacle based on a time-invariant characteristic of the received scattered component of the signal, the time-invariant characteristic of the received scattered component of the signal being a power amplitude thereof for the determined location information of the human being;
instructions to interpret, through a gesture interpretation circuit, a gesture from the human being to at least one of: trigger transmission of the signal from the transmitter circuit, and switch on at least one of: the receiver circuit and the distance sensor circuit
instructions to add data related to the obstacle to the at least one database associated with the central server following the determination thereof as the new obstacle and the static obstacle.

13. The non-transitory medium of claim 12, further comprising:
instructions to detect, through the distance sensor circuit in conjunction with the processor, another obstacle during the locomotion of the human being;
instructions to determine, through the central server in conjunction with the processor, that the another obstacle is also a new obstacle based on the determined location information and the predefined obstacle data; and
instructions to determine, through the central server in conjunction with the processor, that the another obstacle is a dynamic obstacle based on a time variant characteristic of a received component of the signal from the transmitter circuit scattered by the another obstacle without adding data related to the another obstacle to the at least one database, the time variant characteristic of the received component of the signal scattered by the another obstacle being a power amplitude thereof for the determined location information of the human being.

14. The non-transitory medium of claim 12, comprising instructions compatible with the transmitter circuit comprising a plurality of transmitters.

15. The non-transitory medium of claim 12, comprising instructions compatible with the communication circuit being one of: a buzzer circuit, a vibration transducer circuit, and a voice command circuit.

16. The non-transitory medium of claim 12, comprising instructions compatible with powering the receiver circuit through a battery.

17. The non-transitory medium of claim 12, comprising instructions compatible with the communicative actions being a corresponding one of: beeps, vibrations and voice commands.

\* \* \* \* \*